United States Patent

[11] 3,529,574

| [72] | Inventors | William E. Kelley<br>Euclid;<br>Robert J. De Fasselle, Gates Mills, Ohio |
|---|---|---|
| [21] | Appl. No. | 788,146 |
| [22] | Filed | Dec. 31, 1968 |
| [45] | Patented | Sept. 22, 1970 |
| [73] | Assignee | Aquarium Systems, Inc.<br>Wickliffe, Ohio<br>a corporation of Ohio |

[54] CORNER AIR LIFT FOR AQUARIUMS
8 Claims, 3 Drawing Figs.

[52] U.S. Cl. .................................................. 119/5, 210/169
[51] Int. Cl. ...................................................... A01k 63/00
[50] Field of Search ............................................ 119/5, 3; 210/169; 119/2

[56] References Cited
UNITED STATES PATENTS

| 2,782,161 | 2/1957 | Willinger et al. | 119/5 |
| 3,119,774 | 1/1964 | Arak | 210/169 |
| 3,149,608 | 9/1964 | Murphy | 119/5 |
| 3,304,912 | 2/1967 | Hackman et al. | 119/5 |

Primary Examiner—Hugh R. Chamblee
Attorney—Oberlin, Maky, Donnelly and Renner

ABSTRACT: A corner air lift in the form of a plate disposed across one or more corners of an aquarium to form with the adjacent sides of the aquarium tank a water lift chamber. The top of the plate desirably extends above the normal water level within the aquarium so that animals cannot swim into the water lift chamber. Narrow slots or other apertures in the plate adjacent the upper edge permit circulation of water without the need of lifting the water up over the upper edge.

Patented Sept. 22, 1970

3,529,574

INVENTORS
WILLIAM E. KELLEY
ROBERT J. De FASSELLE

BY
Oberlin, Maky, Donnelly & Renner
ATTORNEYS

CORNER AIR LIFT FOR AQUARIUMS

BACKGROUND OF THE INVENTION

This invention relates generally as indicated to a corner air lift for aquariums and more particularly to an improved device for circulating and aerating the water within an aquarium.

There are several different types of air lift devices presently being used which provide circulation of water within an aquarium to cause movement of the water through a filtrant bed and the like for removal of impurities from the water that might otherwise harm or kill aquatic life within the aquarium. However, oftentimes the equipment required is very elaborate and expensive, and the air lift device produces the necessary circulation of water only if a large volume of air is introduced into the device.

Moreover, the air lift devices presently being used in conjunction with under gravel filtration installed wholly within an aquarium tank are positioned near corners of the tank to render them less unsightly. In this position, dirt and other aquarium debris accumulates between them and the tank corner where access for cleaning is poor. Further, when fishes must be captured for removal from the tank they commonly retreat into this corner behind the air lift. The air lift tubes are usually made of small diameter and of transparent material to further reduce their appearance as an unsightly artifact in the natural decor of the aquarium tank. Such small tubes do not deliver the flow rates of water required for efficient operation of the filter.

Air lift devices can also be a hazard to the animal life, since many species will try to swim into the air lift chamber where they become caught or trapped. This problem may be substantially eliminated by positioning the outlet of the device above water level, but then the device may not adequately lift the water through the outlet.

The location of the air lift device within the aquarium may also be hazardous to the animal life, since as a general rule it is preferred that the device be positioned as close to the wall and desirably in a corner so that it is as inconspicuous as possible and convenient to the air supply lines which are usually draped over the edge of the aquarium. However, no matter how close the device is placed next to the wall, there is usually sufficient room for an adventuresome animal to squeeze in behind it and not be able to get free.

It is also common practice to equip an aquarium with an air diffusing device, usually as an "air-stone", powered by a source of compressed air to improve gas exchange relationships within the aquarium water by aeration. The disposition of such an unsightly artifact with its attached air hose in an aquarium where it will not detract from the appearance of the aquarium, or interfere with the aquarist's operations in it, or uproot aquatic plants with the turbulence associated with the rising stream of air bubbles, has posed practical problems for the aquarist.

SUMMARY OF THE INVENTION

With the foregoing in mind, it is a principal object of the present invention to provide an air lift device of very simple and inexpensive construction which nevertheless is capable of circulating a large volume of water in relation to the amount of air introduced, and can be quickly and easily installed in existing as well as new aquarium tanks.

A further object is to provide such a device in which the upper edge of the water lift chamber is above water level thus eliminating the chance of animals swimming into and becoming trapped therein, and without unduly limiting the water circulating capabilities of the device.

Another object is to provide a device of the type described which closely fits within the corner of an aquarium where it is out of the way and animal life cannot squeeze behind it; nor can dirt and aquarium debris accumulate behind it.

And still another object of this invention is to provide a satisfactory location for an air-stone.

These and other objects of the present invention are achieved by disposing a plate which may be flat, convex or of other shapes across one or more of the corners of an aquarium tank to form with the adjacent sides a water lift chamber. The top of the plate desirably extends above the level of water within the aquarium so that animals cannot enter the same, and narrow slots or other apertures such as a screened opening are provided in the plate adjacent the upper edge to permit discharge of the water from the water lift chamber without lifting the water up over the upper edge.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

DESCRIPTION OF THE PREFERRED EMBODIMENT

Figure 1:
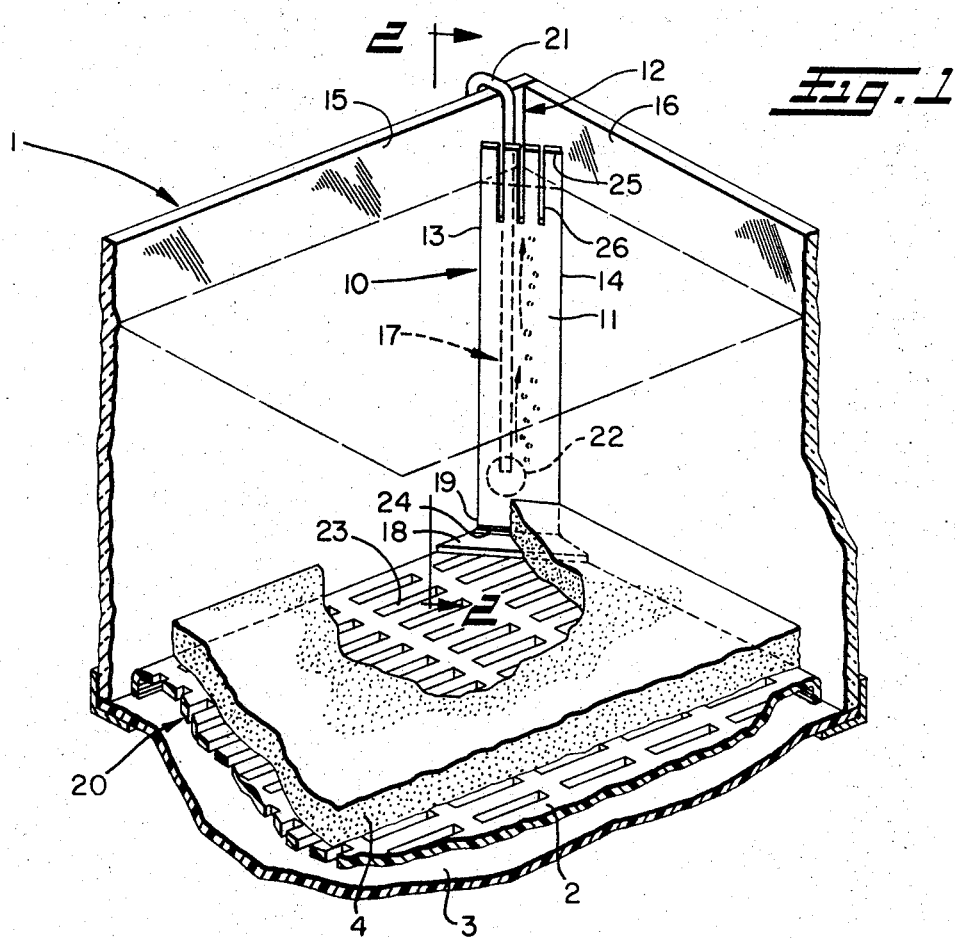
FIG. 1 is a fragmentary perspective view of an aquarium of conventional type partially broken away with an air lift device constructed in accordance with this invention disposed in one of the corners.
Figure 2:
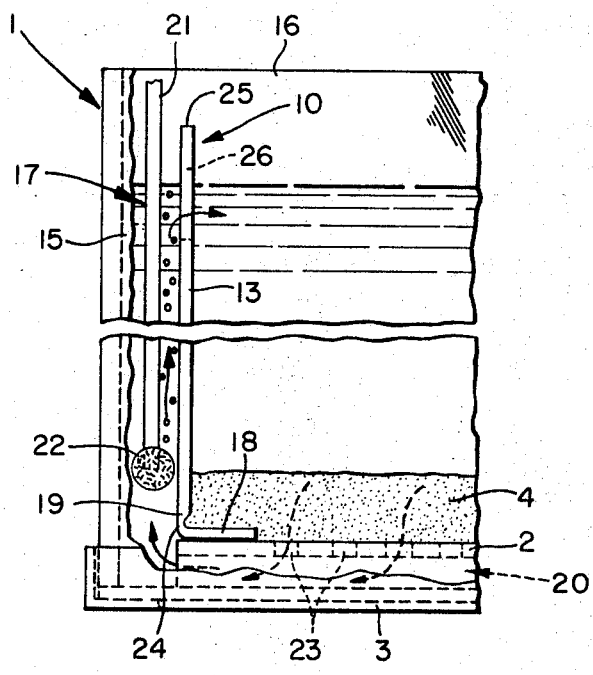
FIG. 2 is a fragmentary side elevation view of the aquarium of FIG. 1 with a portion of the near side broken away to show the water lift chamber behind the plate and the circulation of water therethrough, as seen from the plane of the line 2–2.

Referring now in detail to the drawing, there is shown in FIG. 1 an aquarium tank 1 which may be of the type used commercially or in the home, having an underfiltrant plate 2 contained therein adjacent to but vertically spaced from the bottom 3 of the tank and covered by a suitable filtrant 4. Circulation of the water through the filtrant 4 to remove impurities and the like therefrom which might otherwise be injurious or fatal to the aquatic life in the tank is very effectively achieved by a corner air lift device 10 which in accordance with this invention desirably consists of an elongated plate 11 disposed in one or more corners 12 of the tank. At least portions of the vertically extending edges 13, 14 of the plate 11 are in sealing engagement with the adjacent tank sides 15, 16 to form therewith a water lift chamber 17.

The plate 11 may be anchored in position on top of the underfiltrant plate 2 by providing an outturned flange 18 on the lower end 19 of the plate 11 engaging the underfiltrant plate 2 which is adapted to rest on the underfiltrant plate 2 and covered by the filtrant material. Although various types of non-corrosive materials may be used for the plate 11 and outturned flange 18, it is preferred that they be made out of a plastic which is relatively inexpensive and may be readily molded or extruded into the desired shape.

Figure 3:
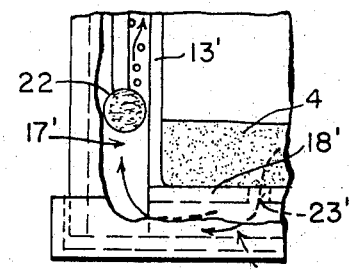
FIG. 3 is a fragmentary side elevation view of a modified form of air lift device in accordance with the present invention.

Fluid communication between the water lift chamber 17 and filtered water chamber 20 beneath the underfiltrant plate 2 may be established in any convenient manner, as by eliminating a corner from the underfiltrant plate 2 as shown, or by providing an aperture through the underfiltrant plate behind the elongated plate 11. Alternatively, the outturned flange 18' may itself be the underfiltrant plate as shown in FIG. 3, provided with apertures and made large enough to cover a sufficient portion of the bottom of the aquarium tank and suitably spaced therefrom, in which event there would be direct communication between the filtered water chamber 20' beneath the flange 18' and water lift chamber 17'.

Air is supplied to the water lift chamber 17 near the bottom by an air supply hose 21 suitably connected to an air pump (not shown) which air supply hose may be draped over the side of the tank or extend through an opening in the tank bottom. The air may be permitted to escape directly from the submerged end of the air supply hose 21, but it is preferred that a porous air stone 22 or other air diffusing device be attached thereto since it will create a steady stream of air bubbles which more effectively lift the water within the chamber 17 than the larger air bubbles emitted directly from the end of the air supply hose. As the water contained within the chamber 17 is lifted with the air bubbles, it is replaced by water from the filtered water chamber 20 to provide a continuous circulation of water within the tank flowing from the chamber 17 down through the filtrant 4 and apertures 23 in the underfiltrant plate 2 back into the chamber 20, and so on.

Because of the rising air bubbles within the water lift chamber 17, the pressure acting on the outer face of the flat plate 11 is greater than the pressure within the water lift chamber 17 acting on the inner face. Accordingly, the difference in pressure existing between the space "inside" of the air lift and the main body of the aquarium itself, due to the motion of the air lifted water behind the lift, forces the air lift section against the sides of the aquarium, which is a requirement for proper operation. If there is too much leakage between the edges of the plate 11 and sides of the aquarium, the water will not be drawn down through the filtrant but, instead, will be drawn in around the sides of the corner air lift and no filtering will take place. However, in actual practice it has been found that the corner lift may be sufficiently pressure seated against the sides of the tank to make it operative without too much leakage. Making the plate 11 somewhat flexible enhances the pressure seating thereof against the sides of the aquarium.

The anchoring flange 18 may also be connected to the plate 11 by a thin section 24 of a flexible plastic or a spring connection may be provided therebetween thus permitting the plate 11 and flange 18 to be shipped in a flattened condition, and when the flange 18 is bent perpendicular and anchored by filtrant as previously described, the flat plate 11 will be further urged by the resilient connection into sealing engagement with the tank sides. Alternatively, the flange 18 may be a separate piece which snaps into place. Moreover, the corner air lift 10 and sub-gravel plate 2 may be molded in one flat piece of some flexible material, such as plastic, which causes the corner lift portion of the molding to be forced tightly against the aquarium tank sides when it is bent up from the flat, original molded shape. Alternatively, a suitable adhesive is used to insure a fluid-tight seal between the edges of the plate 11 and adjacent sides of the tank, and the flange 18 may also be adhesively bonded to the plate 11.

When the plate 11 is installed as described above, there are no cracks or gaps between the plate 11 and sides of the tank through which aquatic animals might squeeze and become stuck or trapped within the water lift chamber 17. Moreover, it is preferred that the upper edge 25 of the plate 11 be above water level so that animals cannot swim down into the water lift chamber 17 and become trapped. Narrow vertical slots 26 or other apertures may be provided in the upper edge 25 of the plate 11 to permit discharge of water from the chamber 17 without having to be lifted above the water level in the tank, such slots or apertures being sufficiently small that aquatic animals cannot pass therethrough. Slots approximately ⅛ inch wide and 2½ inches long have proved to operate satisfactorily for this purpose.

From the above discussion, it can now be seen that the corner air lift of the present invention is of a unique and simple construction which permits it to be readily installed in a corner of an aquarium tank in such a manner that aquatic animals can neither become caught behind the device nor swim into it, without substantially reducing its effectiveness in circulating the water within the tank. To the contrary, in some applications it has been found that the triangular configuration of the water lift chamber has resulted in a greater increase in water flow for the same air supply than the prior art cylindrical air lifts. For example, an air lift chamber having a circular cross section with a 2 inch I.D. produces a water flow rate of approximately 270 gallons/hr. in a tank having a water height of 12 inches using an air supply of 11 cu. ft./hr., whereas an air lift chamber of triangular section with a 3 inch hypotenuse produces a water flow rate of approximately 345 gallons/hr. using the same air supply, a flow increase of about 28 percent.

Although only one such corner air lift is shown, it should be understood that additional air lifts may be provided in the other corners of the tank as required depending upon the size of the tank and air supply and capabilities of the filtrant. Moreover, two such plates 11 could be disposed at right angles to each other to form with one side of the tank a triangular shaped air lift. Furthermore, the plate which cooperates with the sides of the tank to form the water lift chamber may be of other configurations, such as curved or multi-sided. Because the corner air lift uses one or two sides of the aquarium tank for its sides, the cost of manufacture is greatly reduced.

We claim:

1. An air lift device for aquariums and the like comprising a vertically extending plate disposed in a corner in said aquarium, said vertically extending plate having vertical edges at least portions of which are in sealed engagement with the sides of said aquarium which form said corner to define therebetween a water lift chamber, said aquarium having an apertured underfiltrant plate disposed adjacent the corner of said aquarium which is engaged by the lower end of said vertically extending plate, said underfiltrant plate providing a filtered water chamber beneath said underfiltrant plate in communication with said water lift chamber, means for introducing air into said water lift chamber to lift the water within said water lift chamber, and apertures in the upper portion of said vertically extending plate through which the lifted water is discharged from said water lift chamber.

2. The air lift device of claim 1 in which an adhesive is used to establish sealed engagement between the edges of said vertically extending plate and sides of said aquarium.

3. The air lift device of claim 1 wherein said vertically extending plate is flat and defines with the sides of said aquarium which forms said corner a triangular shaped water lift chamber.

4. The air lift device of claim 1 further comprising an outturned flange on the lower end of said vertically extending plate engaging said underfiltrant plate.

5. The air lift device of claim 4 wherein said flange has a yieldable connection with said vertically extending plate for urging the edges of said vertically extending plate into sealed engagement with the sides of said aquarium.

6. The air lift device of claim 1 wherein said means for introducing air into said water lift chamber comprises an air releasing device disposed adjacent the bottom of said water lift chamber and having an air line connected thereto.

7. An air lift device for aquariums and the like comprising a vertically extending plate disposed in a corner in said aquarium, said vertically extending plate having vertical edges engaging the sides of said aquarium which forms said corner to define therebetween a water lift chamber, said aquarium having an apertured underfiltrant plate disposed adjacent the bottom of said aquarium which is engaged by the lower end of said vertically extending plate, said underfiltrant plate providing a filtered water chamber beneath said underfiltrant plate in communication with said water lift chamber, means for introducing air into said water lift chamber to lift the water within said water lift chamber, such air causing a differential water pressure within said aquarium acting on opposite sides of said vertically extending plate urging the edges of said vertically extending plate into sealed engagement with the sides of said aquarium which forms said corner, and apertures in the upper portion of said vertically extending plate through which the lifted water is discharged from said water lift chamber.

8. The air lift device of claim 7 wherein said vertically extending plate is made of a flexible material to enhance the pressure seating thereof against the sides of said aquarium.